(12) United States Patent
Charrin

(10) Patent No.: US 6,601,771 B2
(45) Date of Patent: Aug. 5, 2003

(54) COMBINED SMARTCARD AND MAGNETIC-STRIPE CARD AND READER AND ASSOCIATED METHOD

(75) Inventor: Philippe A. Charrin, Los Angeles, CA (US)

(73) Assignee: Smart Card Integrators, Inc., Los Angeles, CA (US)

( * ) Notice: Subject to any disclaimer, the term of this patent is extended or adjusted under 35 U.S.C. 154(b) by 0 days.

(21) Appl. No.: 09/832,243

(22) Filed: Apr. 9, 2001

(65) Prior Publication Data

US 2002/0145051 A1 Oct. 10, 2002

(51) Int. Cl.[7] .............................................. G06K 19/06
(52) U.S. Cl. ...................................... 235/492; 235/486
(58) Field of Search ................................ 235/375, 379, 235/383, 381, 492, 441, 493, 486, 487, 380; 705/41, 40, 11, 67, 68; 273/435

(56) References Cited

U.S. PATENT DOCUMENTS

| | | | |
|---|---|---|---|
| 4,443,027 A | * | 4/1984 | McNeely et al. .............. 283/83 |
| 4,550,248 A | * | 10/1985 | Hoppe et al. ................ 235/492 |
| 4,603,249 A | * | 7/1986 | Hoppe et al. ................ 235/492 |
| 4,780,603 A | * | 10/1988 | Hamada ...................... 235/492 |
| 5,036,461 A | | 7/1991 | Elliott et al. .................... 705/44 |
| 5,038,022 A | | 8/1991 | Lucero ........................ 235/380 |
| 5,179,517 A | * | 1/1993 | Sarbin et al. ................ 364/410 |
| 5,371,345 A | | 12/1994 | LeStrange et al. .......... 235/380 |
| 5,429,361 A | | 7/1995 | Raven et al. ................ 273/138 |
| 5,748,737 A | * | 5/1998 | Daggar ......................... 380/24 |
| 5,917,168 A | * | 6/1999 | Nakamura et al. .......... 235/379 |
| 6,012,832 A | | 1/2000 | Saunders et al. ........... 364/410 |
| 6,019,283 A | | 2/2000 | Lucero ........................ 235/380 |
| 6,089,982 A | | 7/2000 | Holch et al. .................. 463/42 |
| 6,117,013 A | | 9/2000 | Eiba ............................. 463/41 |
| 6,330,978 B1 | * | 12/2001 | Molano et al. ............. 235/492 |

FOREIGN PATENT DOCUMENTS

| | | |
|---|---|---|
| DE | 195 02 613 A1 | 8/1996 |
| EP | 0 360 613 A2 * | 9/1989 |
| EP | 1 139 310 A2 * | 3/2001 |
| WO | WO 01/41892 A2 A3 | 6/2001 |

OTHER PUBLICATIONS

Schneier, "Applied Cryptography, Second Edition," Sections 22.1 through 22.5, pp. 513–522, 1996.

* cited by examiner

*Primary Examiner*—Thien M. Le
(74) *Attorney, Agent, or Firm*—Irell & Manella LLP

(57) ABSTRACT

A multi-functional portable data device (preferably a combined smart card and magnetic-stripe card) is used for exchanging money with a financial institution in a cashless (i.e., credit or debit) transaction, and to credit or debit an electronic purse ("e-purse") resident on the portable data device. An integrated data reading device can be used to conduct the various monetary transactions electronically so as to transfer money between the financial institutions and the e-purse on the portable data device. The portable data device preferably can be presented to gaming devices in a cashless gaming environment to allow the customers to use the gaming devices.

35 Claims, 6 Drawing Sheets

Card Back face

Card Front face

COMBINED SMARTCARD AND MAGNETIC-STRIPE CARD AND READER AND ASSOCIATED METHOD

BACKGROUND OF THE INVENTION

1. Field of the Invention

The field of the present invention relates to gaming devices and systems and, more particularly, to methods and systems for utilizing a combination smartcard and magnetic-stripe card and reader in a gaming system.

2. Background

Casinos and gaming establishments have traditionally relied upon coin-operated gaming devices. Such coin-operated gaming devices have a number of drawbacks or limitations. For example, they generally require customers to carry around large numbers of coins, which can be inconvenient or burdensome to customers.

To increase the convenience to customers, casinos and gaming establishments have for a number of years sought to provide a cashless gaming system. Some proposed systems, for example, allow customers to use gaming establishment credit cards to transfer playing credits to, and retrieve credits from, a particular gaming machine. An example of a such a system is described in U.S. Pat. No. 6,019,283. Many places in the United States and the rest of the world presently do not allow gambling on credit, however, making credit card systems of limited use. A similar proposed system allows use of a player-carried device such as a magnetic-stripe card to allow customers to use coin-operated game devices by paying a lump sum in lieu of using individual coins. Such a system is described, for example, in U.S. Pat. No. 4,575,622.

Yet another proposed approach is described in U.S. Pat. No. 5,179,517, which discloses a system in which a credit account for a particular customer is maintained on a portable data carrier commonly known as a "smart card." A smart card is a device generally in the size and shape of a standard credit card, encapsulating solid-state memory, circuitry for allowing the memory to be read from or written to, and, in certain cards, microprocessor circuitry for performing various programmable functions. Smart cards may be equipped with an interface having electrical contacts which make a physical connection with a smart card reader, or else may be equipped with a radio frequency (RF) interface to allow a smart card reader to interact with the smart card electronic circuitry over an RF communication link. A standard (ISO) protocol has been developed within the smart card industry for communicating between smart cards and smart card readers.

Other examples of data cards used for conducting cashless exchanges with a gaming machine or system are described in U.S. Pat. No. 6,089,982, which involves use of a player ID card for establishing gaming sessions at player terminals, and U.S. Pat. No. 5,371,345, which describes a change card having a memory storing a cash value which a change person can use to input a credit into a gaming machines in exchange for cash from a player.

Cashless gaming systems are most often utilized in an environment in which the various gaming devices are all connected to and controlled by a central computer, which serves as the host for a local area network, and such systems are referred to as "on-line" systems. Such on-line gaming systems have certain advantages such as centralized control and player tracking capability. On the other hand, "off-line" gaming devices are generally stand-alone, and are not directly tied to a host computer or a network. However, they generally have the advantage of being deployable in any locale without requiring the expense and overhead of a central computer system.

The foregoing approaches to cashless or card-based gaming, while providing some measure of convenience, nevertheless have drawbacks or limitations which make them less than ideal. For example, many of the cashless or card-based systems are inconvenient when the player moves from gaming machine to gaming machine, particularly if the gaming machines are not tied to the same central computer system. Some of the cashless or card-based systems require the involvement of gaming establishment personnel to, e.g., add credit amounts to the playing card. This requirement limits the locations in which gaming machines can be utilized, and also can be inconvenient to players.

There is a need for a gaming system which provides increased convenience to players and gaming establishments, and which overcomes or mitigates various drawbacks and limitations in conventional cashless or card-based gaming systems.

SUMMARY OF THE INVENTION

The invention provides in one aspect systems, methods and techniques for secure cashless gaming which can be used with off-line or on-line gaming devices. In one or more embodiments, a single device in the form of a multi-functional portable data device (preferably a combined smart card and magnetic-stripe card) can be used to exchange money with a financial institution in a cashless (i.e., credit or debit) transaction, and to credit or debit an electronic purse ("e-purse") resident on the portable data device. An integrated data reading device can be used to conduct the various monetary transactions electronically so as to transfer money between the financial institutions and the e-purse on the portable data device. The portable data device preferably can be presented to gaming devices in a cashless gaming environment to allow the customers to use the gaming devices.

Further embodiments, variations and enhancements of the invention are also described herein.

BRIEF DESCRIPTION OF THE DRAWINGS

FIG. 4 shows initial verification and other steps in the exemplary process flow. FIG. 5 shows steps for crediting an e-purse on the portable data device, while FIG. 6 shows steps for debiting an e-purse on the portable data device.

DETAILED DESCRIPTION OF PREFERRED EMBODIMENTS

Figure 1:
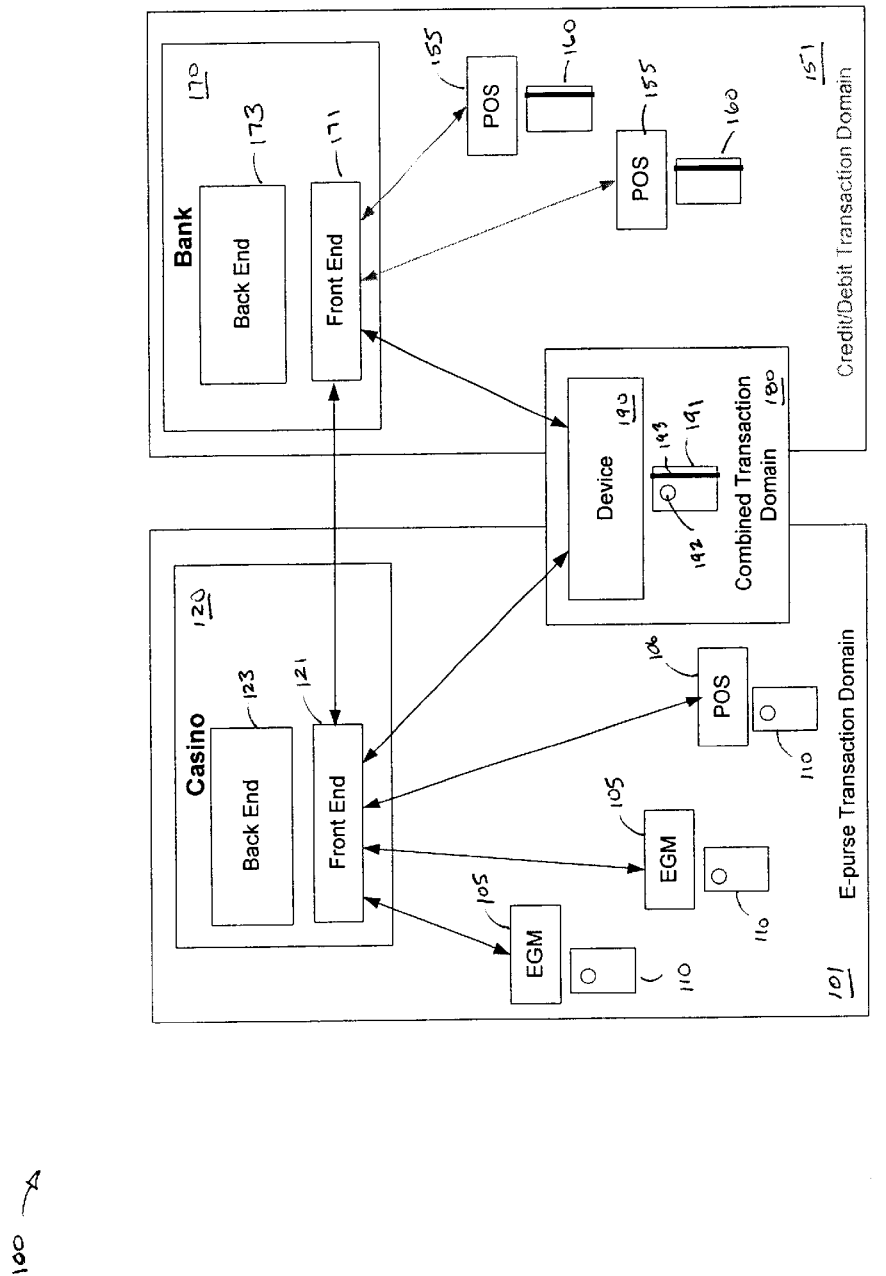
FIG. 1 is a conceptual block diagram of a system which supports use of a portable data device such a combined smart card and magnetic-stripe card.

FIG. 1 is a conceptual block diagram of a preferred system 100 which supports use of a portable data device such a combined smart card and magnetic-stripe card. As shown in FIG. 1, the system 100 includes an e-purse transaction domain 101, a credit/debit transaction domain 151, and a combined transaction domain 180. A multi-functional portable data device 191 can be used in any of the three domains—that is, in the e-purse transaction domain 101, the credit/debit transaction domain 151, or the combined transaction domain 180. When used in the e-purse transaction domain 101, the multi-functional portable data device 191 permits electronic transactions utilizing an e-purse stored on the multi-functional data device 191. The e-purse may be accessed via a smart card interface 192 integral with the multi-functional data device 191. When used in the credit/debit transaction domain 151, the multi-functional portable data device 191 permits electronic credit and/or debit transactions utilizing, e.g., a magnetic stripe 193 or other such media affixed to or integrated with the multi-functional data device 191. When used in the combined transaction domain 180, the multi-functional portable data device 191 permits both electronic transactions in the e-purse transaction domain 101 and electronic credit and/or debit transactions in the credit/debit transaction domain 151. Preferred transactions carried out in the combined transaction domain 180 are described in more detail hereinafter.

The credit/debit transaction domain 151 may comprise a conventional banking card domain including, e.g., merchant store card readers, automatic teller machines (ATMs), bank office computer systems, etc., all of which are depicted conceptually as point-of-sale devices 155 in FIG. 1. The multi-functional portable data device 191, like other credit or debit cards 160, may be used to conduct electronic credit and/or debit transactions in the credit/debit transaction domain 151. For example, if the multi-functional portable data device 191 includes a magnetic stripe 193 affixed thereto, the magnetic stripe 193 may be manually swept through a magnetic stripe reader at a point-of-sale device 155 in order to read the information thereon and conduct a conventional credit or debit transaction, depending upon whether the magnetic stripe 193 serves a credit function (as a credit card) or a debit function (as a debit card). Optionally, the magnetic stripe 193 may serve both a credit and debit function. To conduct a credit or debit transaction, the point-of-sale device 155 communicates a front end interface 171 of the computer system of a financial institution (e.g., a bank) 170. The front end interface 171 does initial processing of the credit or debit transaction according to conventional protocols and techniques for handling credit or debit card transactions, and then generally queues the electronic record of the credit or debit transaction at the back end 173 of the financial institution computer system, again according to conventional protocols and techniques.

The point-of-sale devices 155 may connect to the financial institution computer system via a communication link such as conventional telephone line, a private wired line, a local or wide area network, or a global communications network such as the Internet.

The e-purse transaction domain 101 preferably comprises a closed commercial environment, such as an environment provided by a gaming establishment or collective of gaming establishments. The multi-functional portable data device 191 may, like other portable e-purse devices 110, be used to conduct electronic transactions in the e-purse transaction domain 101. For example, if the multi-functional portable data device 191 includes a smart card interface 192 integral therewith, the multi-functional portable data device 191 may be presented to a smart card reader at a point-of-sale device 106 or at an electronic gaming machine 105, in order to add or subtract cash amounts from the e-purse of the multi-functional portable data device 191 by way of an electronic transaction. To conduct an electronic e-purse transaction, the point-of-sale device 106 or electronic gaming machine 105 communicates with a front end interface 121 of the computer system of a gaming establishment (e.g., a casino) 120. The front end interface 121 does initial processing of the electronic transaction according to conventional protocols and techniques for handling electronic e-purse transactions, and then generally transfers an electronic record corresponding to the electronic transaction to the back end 123 of the gaming establishment computer system for further processing, again according to conventional protocols and techniques. Although the e-purse transaction domain 101 is preferably a closed environment, the gaming establishment computer system may be connected to the financial institution computer system via, e.g., their respective front end interfaces 121,171.

The point-of-sale devices 106 and electronic gaming machines 105 may connect to the gaming establishment computer system through a local area network, but may in some embodiments connect to the gaming establishment computer system via a communication link such as conventional telephone line, a private wired line, or a global communications network such as the Internet.

As further illustrated conceptually in FIG. 1, an integrated data reading device 190 can be used to conduct various electronic transactions so as to allow transfer of monetary amounts between the credit/debit transaction domain 151 and the e-purse transaction domain 101, by performing credit/debit transactions with financial institutions 170 within the credit/debit transaction domain 151 and electronic cash transfers to and from the e-purse of the multi-functional data device 191 within the e-purse transaction domain 101. The integrated data reading device 190 preferably has means for receiving the multi-functional data device 191, and allows owners of the multi-functional data device 191 to transfer monetary amounts from a financial institution account to the e-purse stored on the multi-functional data device 191 by a credit or debit transaction, and to transfer monetary amounts from the e-purse to a financial institution account via a reverse credit or debit transaction.

Figure 3:
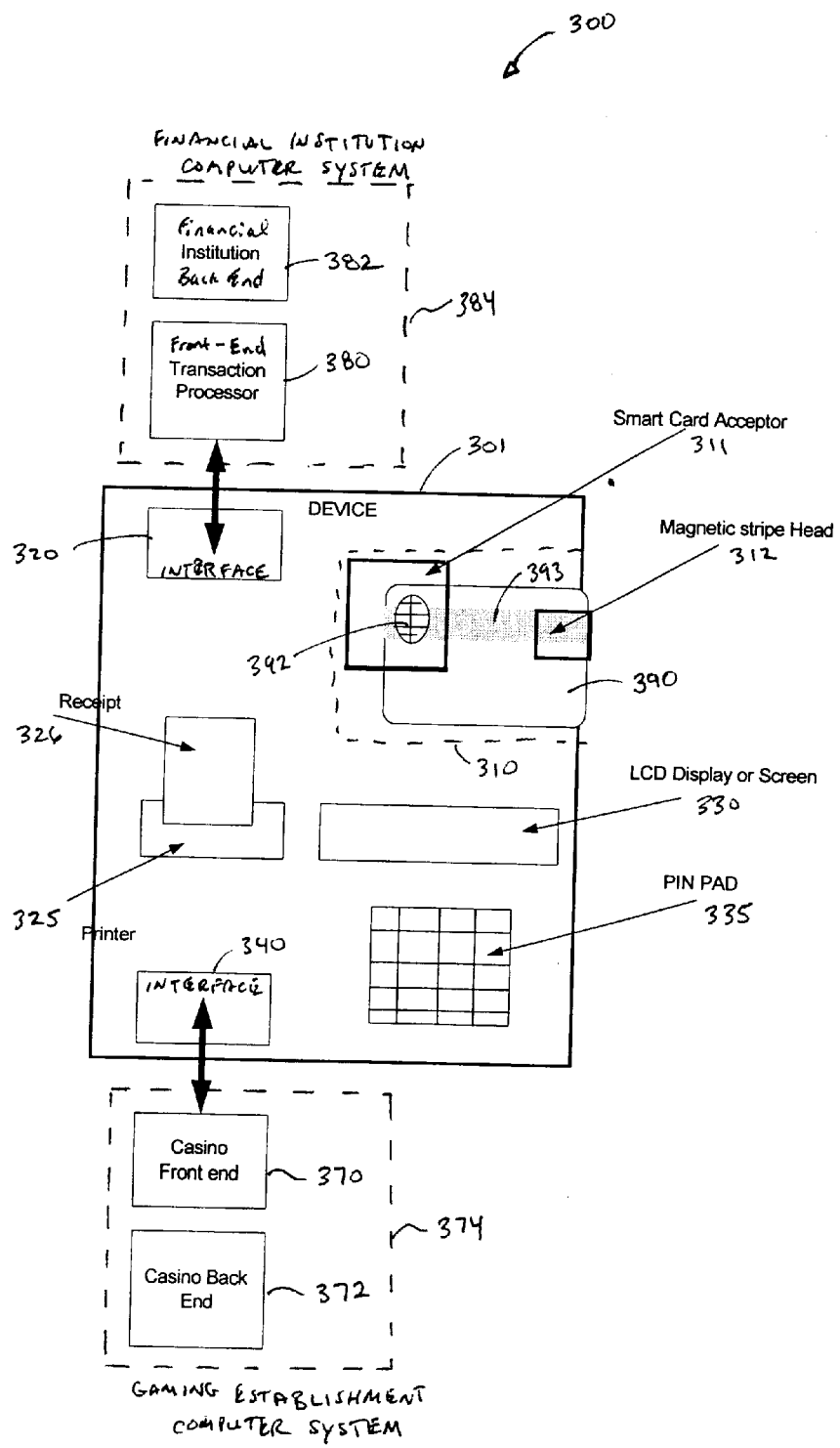
FIG. 3 is a diagram of an integrated data reading device as may be used, for example, in the system shown in FIG. 1.

FIG. 3 is a diagram of one embodiment of an integrated data reading device 301, for use within a combined transaction domain 300, as may be incorporated, for example, in the system shown in FIG. 1. The integrated data reading device 301 may be embodied as an automated teller machine, a kiosk, a combination banking point-of-sale and gaming point-of-sale device, or various other devices. Depending upon its specific architecture and design, the integrated data reading device 301 can be attended or unattended. In the present example illustrated in FIG. 3, the multi-functional data device 191 is embodied as a card 390 having a smart card interface 392 and a magnetic stripe 393. As shown in FIG. 3, the integrated data reading device 301 comprises a reading unit 310 which, in this example, comprises a smart card acceptor 311 and a magnetic stripe head 312, enabling the integrated data reading device 301 to read both from the smart card interface 392 and the magnetic stripe 393 of the card 390. Details of the preferred operation of the integrated data reading device 301 are explained further below.

Figure 2A:
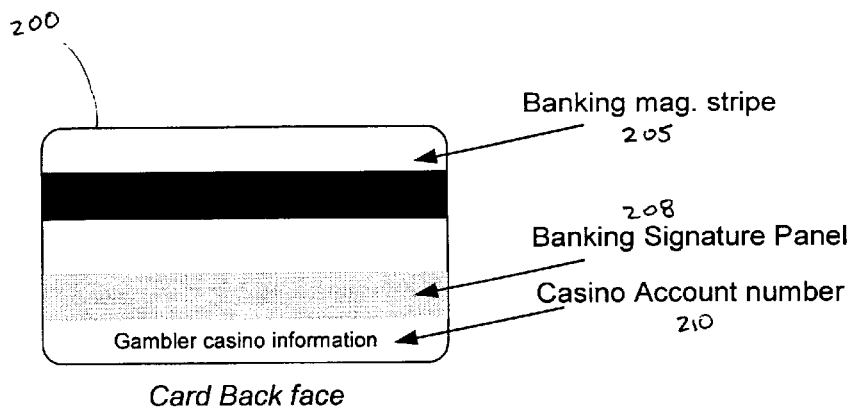
FIGS. 2A and 2B are diagrams showing the back and front, respectively, of one example of a combined smart card and magnetic-stripe card as may be used, for example, in the system of FIG. 1.
Figure 2B:
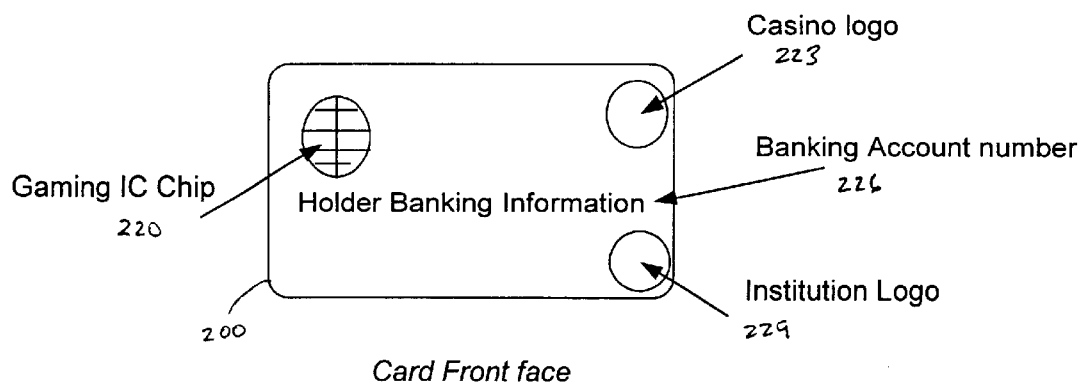

FIGS. 2A and 2B are diagrams collectively illustrating an example of a multi-functional data device embodied as a combined smart card and magnetic-stripe card 200, as may be used, for example, in the system of FIG. 1 or with the integrated data reading device 301 shown in FIG. 3. FIG. 2A illustrates the back of the combined smart card and magnetic-stripe card 200, while FIG. 2B illustrates the front of the combined smart card and magnetic stripe card 200. As shown in FIGS. 2A and 2B, the combined smart card and magnetic-stripe card 200 may include a readable static media portion such as a magnetic stripe 205 (FIG. 2A) storing the card holder's financial institution account information, as well as an embedded integrated circuit (IC) chip 220 (FIG. 2B) storing the card holder's e-purse information. As further illustrated in FIG. 2A, the combined smart card and magnetic-stripe card 200 may include a banking signature panel 208 and a gaming establishment account number 210. The combined smart card and magnetic-stripe card 200 may also include, as illustrated in FIG. 2B, a gaming establishment logo or indicia 223, a financial institution account number 226 (corresponding to the information stored on the magnetic stripe 205), and a financial institution logo or indicia 229.

The combined smart card and magnetic-stripe card 200 may be constructed of a durable material such as plastic, similar to an ordinary credit card or smart card. The smart card portion of the combined smart card and magnetic-stripe card 200, which includes the IC chip 220, preferably comprises solid-state memory, circuitry for allowing the memory to be read from or written to, and in a preferred embodiment as described herein, microprocessor circuitry for performing various programmable functions. The smart card portion of the combined smart card and magnetic-stripe card 200 may be equipped with an interface having electrical contacts which make a physical connection with a smart card reader, or else, alternatively, may be equipped with a radio frequency (RF) interface to allow a smart card reader to interact with the smart card electronic circuitry over an RF communication link. Techniques for manufacturing smart cards and associated electronics, and for communicating between a smart card and a smart card reader via either physical contacts or an RF communication link, are well known and conventional.

In a preferred embodiment, the integrated data reading device 301 is used to conduct various electronic monetary transactions so as to transfer money between one or more financial institutions and the e-purse on the combined smart card and magnetic-stripe card 200. The integrated data reading device 301 comprises an interface 320 for communicating with a front-end transaction processor 380 of a financial institution computer system 384. The integrated data reading device 301 also comprises another interface 340 for communicating with a gaming establishment front end 370 of a gaming establishment computer system 374. To conduct electronic exchanges, the reading unit 310 of the integrated data reading device 301 reads information from the static data portion (e.g. magnetic stripe) of an inserted card 390 and/or exchanges information with the smart card IC chip 392, using the magnetic stripe head 312 or the smart card acceptor 311, respectively. A display 330 (such as a liquid crystal display (LCD) or other screen display) may be provided for conveying information to the operator of the integrated data reading device 301. A keyboard or keypad 335 may also be provided, allowing the operator to enter in numerical values for monetary transactions (as with an automated teller machine) or to enter a personal identification number (PIN). The integrated data reading device 301 may also include a printer 325 for printing out a receipt 326 containing the details of an electronic transaction.

Figure 4:
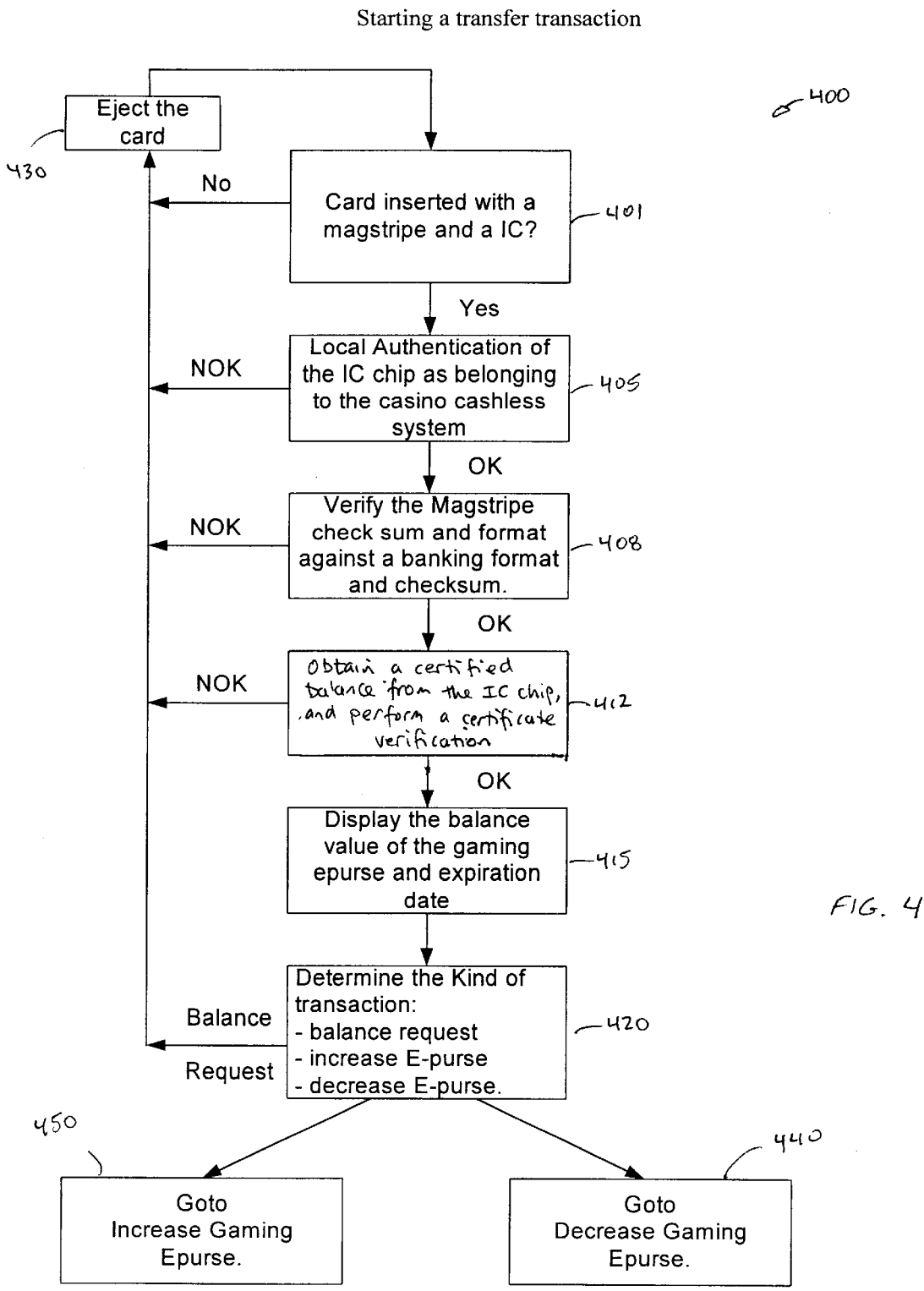
FIGS. 4, 5 and 6 are method flow diagrams illustrating electronic transactions that may be carried out, for example, by one embodiment of the integrated data reading device of FIG. 3.
Figure 5:
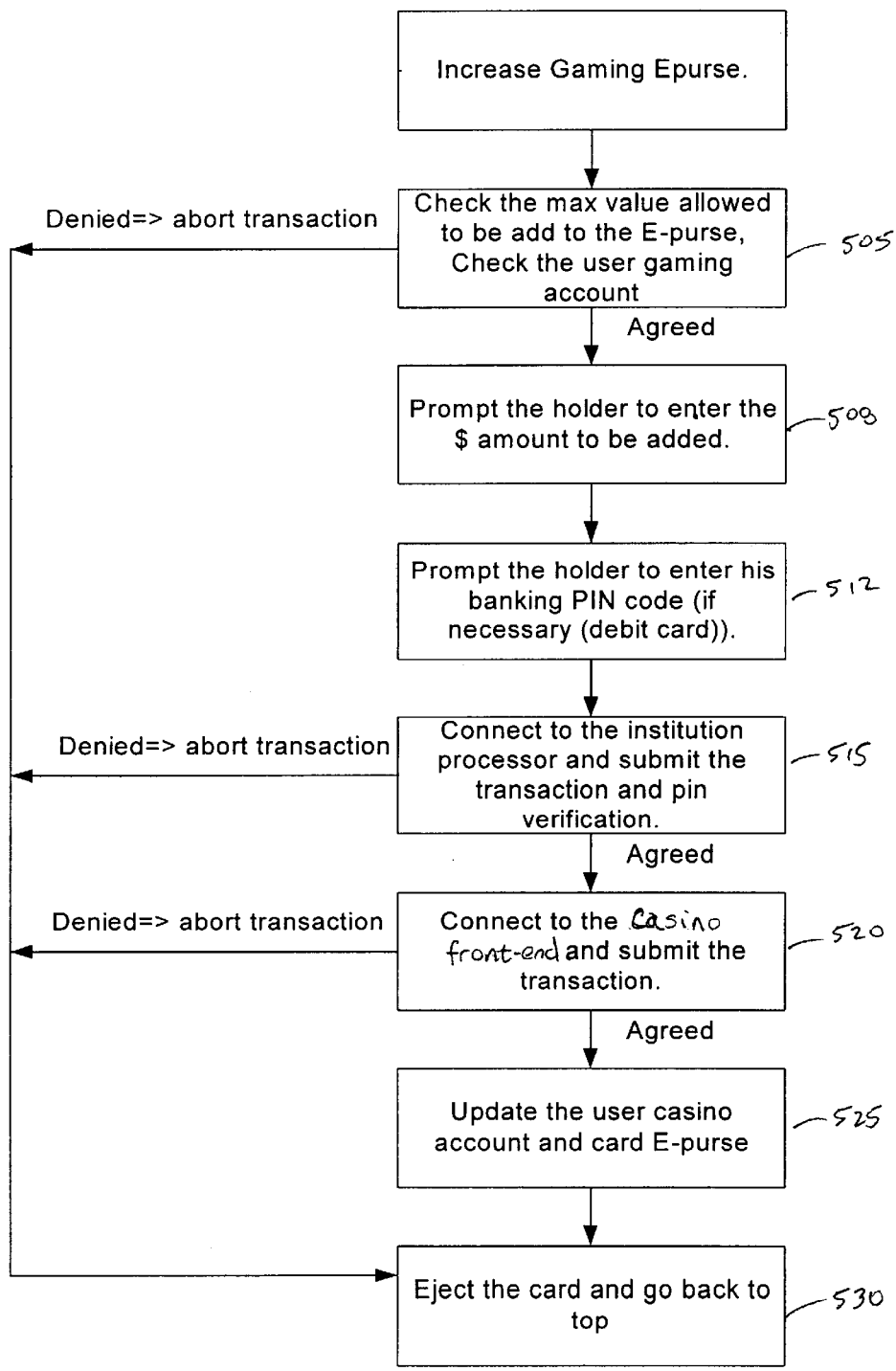
Figure 6:
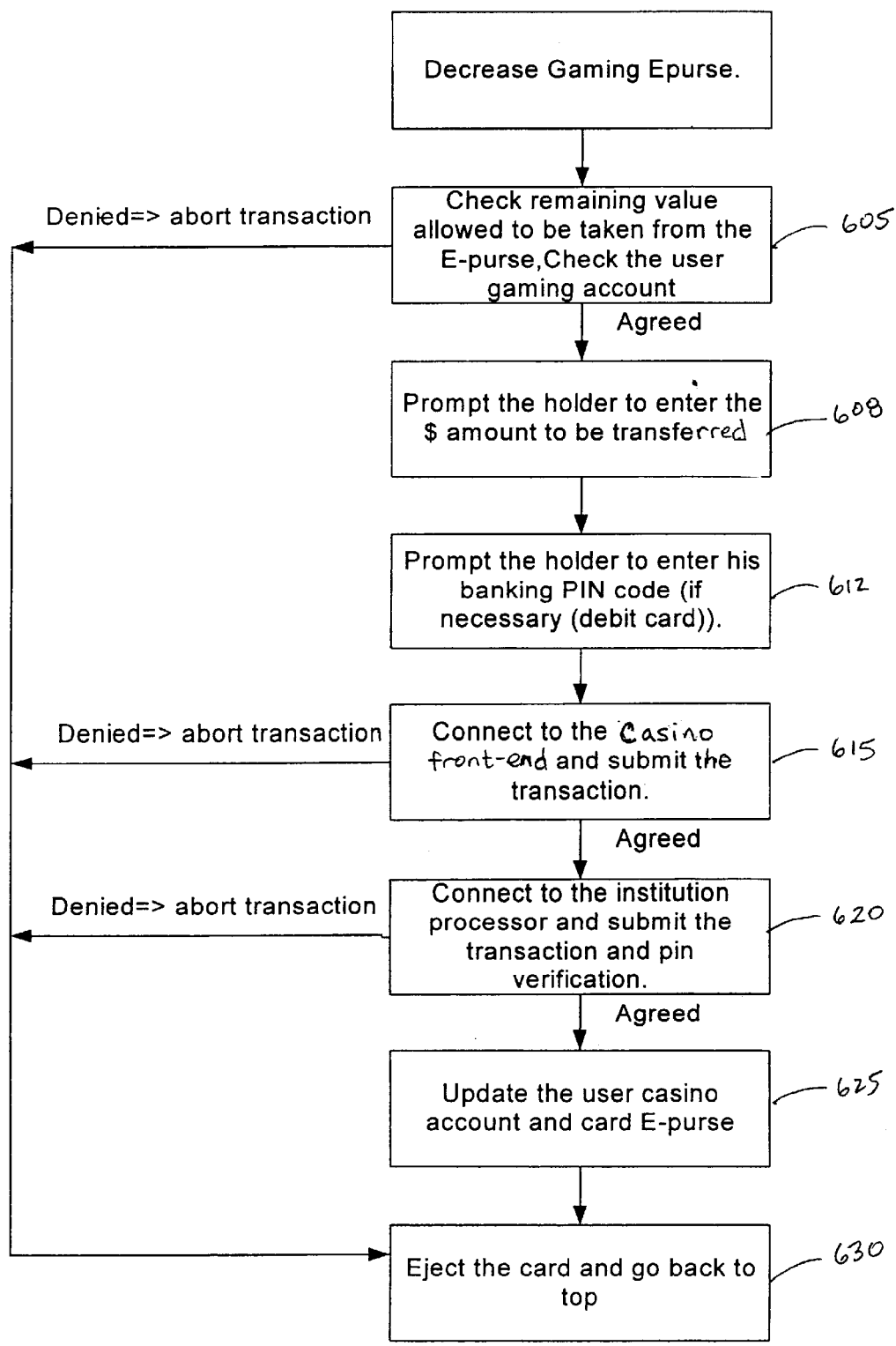

FIGS. 4, 5 and 6 are method flow diagrams illustrating electronic transactions that may be carried out by an integrated data reading device such as the one illustrated in FIG. 3. While the details of the method flow diagrams illustrated in FIGS. 4, 5 and 6 are described with respect to a preferred embodiment of an integrated data reading device 301 shown in FIG. 3, it should be understood that the methodologies illustrated in FIGS. 4, 5 and 6 and the principles and concepts associated therewith may be employed with alternative data reading devices as well.

FIG. 4 shows steps for starting an electronic transaction so as to either increase or decrease the amount of the e-purse on the combined card 390. In a first step 401 of the process flow 400, the card is presented to (e.g., inserted into) the reading unit 310 of the integrated data reading device 301, and the physical characteristics of the combined card 390 are verified. Specifically, the magnetic stripe head 312 reads the data on the magnetic stripe 393 of the inserted card 390, while the smart card acceptor 311 communicates with the smart card IC chip 392 of the card 390. If the magnetic stripe head 312 and the smart card IC chip 392 successfully read the expected information, the process flow 400 moves to a next step 405. If, on the other hand, the expected information is not read, then the card is ejected or otherwise rejected, as indicated by step 430. Assuming a proper magnetic stripe 393 and smart card IC chip 392 are detected by the reading unit 310, one or more verification steps are then carried out. In a preferred embodiment, the integrated data reading device 301 performs local authentication of the smart card IC chip 392 to confirm it was issued by or is otherwise associated with the gaming establishment 120, as indicated by step 405. For example, the integrated data reading device 301 may read a gaming establishment account number from the smart card IC chip 392, and compare it against a table, database or file containing valid account numbers. Such a table, database or file may be stored locally at the integrated data reading device 301 (and periodically updated), or, alternatively, for security purposes, the account numbers may be stored at the gaming establishment computer system 374. In such a case, the integrated data reading device 301 may forward the gaming establishment account number read from the smart card IC chip 392 to the gaming establishment computer system 374, which then authenticates the account number and returns a message indicating whether or not the account number is valid.

After verification of the gaming establishment account number, the integrated data reading device 301, as indicated by step 408, verifies the information read off the static data portion of the card 390 (i.e., the magnetic stripe 393) and may, for example, calculate a checksum and compare it against a predetermined checksum value to confirm the accuracy of the information read from the magnetic stripe 393 as well as to verify the authenticity of the financial institution account information. In addition, the integrated data reading device 301 preferably confirms the format of the information read from the magnetic stripe 393 against a predetermined format (specified by the financial institution). The checksum, financial institution account information and account number format may be stored locally at the integrated data device reader 301. Alternatively, this data may be stored at the financial institution computer system 384, and may be either retrieved upon request by the integrated data reading device 301, or else the data may be forwarded to the financial institution computer system 384 which itself conducts the checksum and verification procedure, returning a message indicating whether or not the procedure was successfully passed.

Assuming the checksum and format verification steps are passed successfully, the integrated data reading device 301 then, as indicated by step 412, the integrated data reading device 301 reads the balance from the e-purse stored on the smart card IC chip 392 of the combined card 390. Preferably the balance read from the e-purse is certified—that is, the smart card IC chip 392 appends a special integrity code or certificate to the balance, based upon a key and the balance amount data. The key is preferably a unique key associated with the particular combined card 390. The certificate is generated internally by the e-purse reading process of the smart card IC chip 392, as a function of the unique key and the particular balance of the e-purse when it is read out.

Assuming the balance read from the e-purse is certified, the integrated data reading device 301 then performs a certification to verify the balance amount read from the e-purse and the associated certificate. To this end, the integrated data reading device 301 recalculates (or otherwise obtains) the card key, generates its own special integrity code or certificate by using the same algorithm as the smart card IC chip 392 with the recalculated card key and the received balance amount, and compares the result with the certificate issued by the combined card 390. If the comparison is positive the process continues.

If any of the foregoing steps 405, 408 or 412 results in a verification failure, the integrated data reading device 301 ejects the combined card 390, as indicated by step 430 in the process flow 400, and the process aborts.

Assuming the verification steps 405, 408 and 412 are successfully passed, the process flow moves to step 415, whereupon the balance value of the e-purse stored on the smart card IC chip 392 and the expiration date, if any, of the combined card 390 are displayed for the operator on the screen display 330 of the integrated data reading device 301. At this point, the operator may select a transaction to perform relating to the e-purse. The operator preferably selects the transaction using the buttons of the keypad 335 or using any other provided data input means (such as, e.g., a touchscreen, individual buttons with dedicated functions, a microphone and internal voice recognition electronics and/or software, etc.). In step 420, the integrated data reading device 301 determines the type of requested transaction. Examples of transaction types may include, e.g., a balance request, an increase to the e-purse amount, a decrease to the e-purse amount, or any other type of transaction that can be conducted with an e-purse or magnetic stripe card.

If the requested transaction is a balance request, then the balance amount may be printed out on a transaction receipt 326 using printer 325, and the card 390 may then be automatically ejected or, optionally, further transactions may be permitted in the same session. If, on the other hand, a request is made to increase the amount of the e-purse, then steps are carried out to increase the e-purse through an electronic monetary transaction. Preferred steps for doing so are illustrated in the process flow 500 shown in FIG. 5. In step 505 of the process flow 500, the integrated data reading device 301 determines the maximum value allowed to be added to the e-purse, and also verifies the card holder's gaming account information. The combined card 390 is checked against a bad card list, and the validity period (i.e., expiration date) of the card 390 and the applicable currency are also obtained from the card 390 and, if desired, may be cross-checked by casino records along with, optionally, the maximum value allowed to be added to the e- purse. In one particular embodiment, the integrated data reading device 301 accepts the maximum value so long as it is under a pre-set level, but, if it exceeds the pre-set level, cross-checks the maximum value with the casino records of the gaming establishment computer system 374. Since the e-purse transaction domain 101 is preferably a closed environment, the maximum e-purse value and the account information for each card holding member of the gaming establishment may be conveniently stored locally at the integrated data reading device 301 (and updated periodically from the gaming establishment computer system 374). Alternatively, the integrated data reading device 301 may transmit the card holder's account number to the gaming establishment computer system 374, where the maximum e-purse values can be centrally stored, and in return receive the e-purse maximum value corresponding to the card holder's account number. If the account number is not found in the electronic records of the gaming establishment computer system 374, an error message is returned to the integrated data reading device 301, which then aborts the transaction and displays an appropriate message on the screen display 330 to the operator.

In a next step 508, the integrated data reading device 301 prompts the card holder to enter the monetary amount to be added to the e-purse. The integrated data reading device 301 may, for example, display a message on the display screen 330 requesting the operator to enter the monetary amount to be added to the e-purse. The operator may enter this information using the keypad 335 or any other data input means provided at the integrated data reading device 301. Next, in step 512, if the card 390 is a debit card, or if otherwise required by the nature of the card 390, the card holder is prompted to enter the card holder's personal identification number (PIN) code, which may likewise be entered using the keypad 335 or any other data input means provided at the integrated data reading device 301. In a next step 515, the integrated data reading device 301 connects to the financial institution computer system 384 and submits the transaction request and the card holder's entered PIN code (if applicable) to the front-end transaction processor 380 thereof. This information may be communicated according to any standard protocol used by the credit/debit transaction domain 151 or, alternatively, any acceptable custom protocol. The financial institution computer system 384 receives the account number, PIN code (if applicable) and transaction amount, along with, optionally, a transaction identifier. The financial institution computer system 384 verifies that the account number and, if applicable, the PIN code. If the account number or PIN code is incorrect, the financial institution computer system 384 denies the transaction and returns a message to the integrated data device reader 301 that the transaction is to be aborted. If, on the other hand, the account number and PIN code are properly verified, the financial institution computer system 384 verifies that the amount being requested by the transaction does not exceed the credit amount of the card holder, if the card 390 is being used as a credit card, or else does not exceed the amount of cash in the card holder's bank account, if the card 390 is being used as a debit card. If the requested amount exceeds the card holder's credit limit (if a credit transaction) or available cash (if a debit transaction), the financial institution computer system 384 denies the transaction and returns a message to the integrated data device reader 301 that the transaction is to be aborted. If, on the other hand, the requested amount is within the card holder's account limits, then a transaction approval message is returned to the integrated data device reader 301. In such a case, in step 520, the integrated data device reader 301 connects to the gaming establishment computer system 374 and submits the transaction for processing. The gaming establishment computer system 374 then updates its records, unless the transaction information (e.g., card account number) is invalid, in which case the transaction is denied and the process is aborted.

Upon successful completion of a credit or debit transaction with the financial institution computer system 384, the integrated data reading device 301 then updates the e-purse on the smart card IC chip 392 of the card 390. The integrated data reading device 301 also sends a message to the gaming establishment computer system 374 with the transaction details, so that the gaming establishment computer system 374 can update the card holder's account information at the gaming establishment. Preferably, this update is carried out relatively quickly (e.g., within a few seconds). Should the card 390 be ejected or forcibly removed for any reason before the e-purse amount can be updated, the integrated data reading device 301 may send a message to the financial institution computer system 394 canceling or otherwise backing out the transaction. Once the e-purse account is updated on the card 390 and the gaming establishment account information is updated, the card 390 is ejected from the reading unit 310 and the integrated data device reader 301 is available for further transactions, as indicated by step 530.

If, instead of crediting the amount of the e-purse (as shown in FIG. 5), the operator decides to transfer a monetary amount from the e-purse to a different account, then steps are carried out by the integrated data reading device 301 to debit the e-purse. Preferred steps for doing so are illustrated in the process flow 600 shown in FIG. 6. In step 605 of the process flow 600, the integrated data reading device 301 checks the remaining value on the e-purse (and thus the maximum amount available to transfer), and also verifies the card holder's gaming account information. The remaining value on the e-purse is read directly from the smart card IC chip 392 on the card 390, and may be cross-checked against the remaining e-purse value for the card as stored in the records of the gaming establishment computer system 374 (or, optionally, may be cross-checked only if the remaining value exceeds a certain pre-set level). The combined card 390 is checked against a bad card list, and the validity period (i.e., expiration date) of the card 390 and the applicable currency are also obtained from the card 390, and optionally cross-checked against the electronic gaming establishment records. As previously noted, since the e-purse transaction domain 101 is preferably a closed environment, the account information for each card holding member of the gaming establishment may be conveniently stored locally at the integrated data reading device 301, and periodically updated. Alternatively, the integrated data reading device 301 may transmit the card holder's account number to the gaming establishment computer system 374 for verification. If the account number is not found in the electronic records of the gaming establishment computer system 374, an error message is returned to the integrated data reading device 301, which then aborts the transaction and displays an appropriate message on the screen display 330 to the operator.

In a next step 608, the integrated data reading device 301 prompts the card holder to enter the monetary amount to be transferred from the e-purse. The integrated data reading device 301 may, for example, display a message on the display screen 330 requesting the operator to enter the monetary amount to be transferred from the e-purse. The operator may enter this information using the keypad 335 or any other data input means provided at the integrated data reading device 301. Next, in step 612, if the card 390 is a debit card, or if otherwise required by the nature of the card 390, the card holder is prompted to enter the card holder's personal identification number (PIN) code, which may likewise be entered using the keypad 335 or any other data input means provided at the integrated data reading device 301. In a next step 615, the integrated data device reader 301 submits the transaction to the gaming establishment computer system 374, which then authorizes the transaction or else may deny the transaction for any of a variety of reasons (e.g., account number cannot be found).

Upon receiving approval from the gaming establishment computer system 374, the integrated data reading device 301, in a next step 620, connects to the financial institution computer system 384 and submits the transaction request and the card holder's entered PIN code (if applicable) to the front-end transaction processor 380 of the financial institution computer system 384. Similar to the process described with respect to FIG. 5, this information may be communicated according to any standard protocol used by the credit/debit transaction domain 151 or, alternatively, any acceptable custom protocol. The financial institution computer system 384 receives the account number, PIN code (if applicable) and transaction amount, along with, optionally, a transaction identifier. The financial institution computer system 384 verifies that the account number and, if applicable, the PIN code. If the account number or PIN code is incorrect, the financial institution computer system 384 denies the transaction and returns a message to the integrated data device reader 301 that the transaction is to be aborted. If, on the other hand, the account number and PIN code are properly verified, then a transaction approval message is returned to the integrated data device reader 301. The financial institution computer system 394 then processes a reverse credit or debit transaction, to either add credit to the card holder's credit account, or add cash to the card holder's debit account, according to the transaction amount (i.e., the requested transfer amount from the e-purse on the card 390).

In a next step 625, after receiving the transaction approval message from the financial institution computer system 394, the integrated data reading device 301 updates the e-purse stored in the smart card IC chip 392 of the card 390, by subtracting the amount from the e-purse. The integrated data reading device 301 also sends a message to the gaming establishment computer system 374 with the transaction details, so that the gaming establishment computer system 374 can update the card holder's account information at the gaming establishment. Preferably, this update is carried out relatively quickly (e.g., within a few seconds). Should the card 390 be ejected or forcibly removed for any reason before the e-purse amount can be updated, the integrated data reading device 301 may send a message to the financial institution computer system 394 canceling or otherwise backing out the transaction. Once the e-purse account is updated on the card 390 and the gaming establishment account information is updated, the card 390 is ejected from the reading unit 310 and the integrated data device reader 301 is available for further transactions, as indicated by step 630.

It should be noted that, while the steps illustrated in FIGS. 4, 5 and 6 appear in a certain order in those particular diagrams and have been described according to such an order, those skilled in the art will appreciate that the ordering of the steps can be altered while still providing beneficial functionality to the card holder, financial institution and/or gaming establishment. Therefore, the particular arrangement of steps, or the inclusion of any particular step, is not intended to limit the scope of the invention in any manner.

A combined smart card and magnetic stripe card, and an integrated data device reader, as described herein may be used in connection with a gaming system wherein electronic gaming machines are outfitted with intelligent smart card readers which can manage cash or cashless transactions at the electronic gaming machine. An example of such an intelligent smart card reader is described in copending U.S. application Ser. No. 09/456,021 filed Dec. 3, 1999, assigned to the assignee of the present invention, and hereby incorporated by reference as if set forth fully herein.

According to one exemplary embodiment described in the above-referenced patent application, a secure cashless gaming system comprises a plurality of gaming devices which may or may not be connected to a central host network. Each gaming device preferably includes an intelligent data device reader (for example, a smart card reader) which is uniquely associated with a security module interposed between the intelligent data device reader and the gaming device processor. A portable data device (such as a smart card, or a combined smart card and magnetic-stripe card) bearing credits is used to allow players to play the various gaming devices. When a portable data device is presented to the gaming device, it is authenticated before a gaming session is allowed to begin. The intelligent data device reader in each gaming device monitors gaming transactions and preferably stores the results for later readout in a secure format by a portable data extraction unit, or else for transfer to a central host network. Gaming transaction data may be aggregated by the portable data extraction unit from a number of different gaming devices, and may be transferred to a central accounting and processing system for tracking the number of remaining gaming credits for each portable data unit and/or player. Individual player habits can be monitored and tracked using the aggregated data. In such a system, a combined smart card and magnetic-stripe card (such as shown and described with respect to FIGS. 2 or 3 herein, for example) may be utilized both at an integrated data device reader (as described with respect to FIG. 3 herein, for example) and at an electronic gaming machine having a smart card reader. The smart card reader at the electronic gaming machine may extract one or more credit amounts from the e-purse on the combined smart card and magnetic-stripe card to allow the card holder to play at an electronic gaming machine. In some embodiments, cards only have smart card functionality (without the magnetic-stripe portion) can also be used in the electronic gaming machines (preferably with the same intelligent data device reader), but will not be usable in the integrated data device reader such as described with respect to FIG. 3 herein (since it lacks the magnetic-stripe functionality and, therefore, the ability to conduct credit or debit transactions with a financial institution).

In another embodiment described in the aforementioned patent application, a gaming device includes an intelligent data device reader which is uniquely associated with a security module interposed between the intelligent data device reader and the gaming device processor. Each time an attempt is made to initiate a gaming session (by, e.g., presenting a portable data device such as a smart card, or a combined smart card and magnetic-stripe card), and periodically thereafter, if desired, an authentication process is performed to ensure that the correct intelligent data device reader and the correct security module are present. If one or the other is missing, then the player will be unable to utilize the gaming device, and the portable data device will not be updated. Preferably, an e-purse on the portable data device is used to store the credits which are used at the electronic gaming machine.

In certain embodiments, the intelligent data device reader at an electronic gaming machine may be programmed to automatically transfer gaming credits from a portable data device (for example, a smart card, or a combined smart card and magnetic-stripe card) inserted in the intelligent data device reader to the gaming device. Each time the number of credits falls below a predetermined minimum level, the intelligent data device reader may be programmed to transfer a given number of additional gaming credits to the gaming device, thus alleviating the need for the player to manually enter an amount of gaming credits to transfer to the gaming device.

Other techniques, features and functions described with respect to smart cards in the previously referenced copending patent application are generally applicable as well to a combined smart card and magnetic-stripe card (or other portable data device) as described herein. However, such techniques, features and functions are merely illustrative of the widespread variations which can be utilized in connection with the combined smart card and magnetic-stripe card (and other portable data devices) described herein. As but one example, in addition to storing gaming credit in an e-purse, each portable data device also preferably includes a player identification code, which allows the card to be correlated to a particular individual or entity. The player identification code can be used for accounting purposes when information about particular gaming sessions is extracted from the electronic gaming devices. The portable data device may also comprise one or more files or static or non-volatile memory portions which store identification and other information concerning the player and issuing gaming establishment, secret keys for performing authentication checks, a log of transactions including data from the last N gaming transactions, and a session log containing data from the N last gaming sessions.

Once gaming credit has been placed in the e-purse of a multi-functional portable data device 191 as described herein, the holder may take the multi-functional portable data device 191 to any of the electronic gaming devices 105 and utilize the gaming device in a cashless manner. When a player inserts the multi-functional portable data device 191 into the intelligent data device reader of the electronic gaming machine 105, the electronic gaming machine 105 validates the multi-functional portable data device 191 (preferably using a security module), using, e.g., a cross-authentication check prior to gaming being permitted.

In various alternative embodiments, rather than a smart card with an e-purse, the multi-functional portable data device 191 may comprise another type of data storage and retrieval unit. An embodiment in which the multi-functional portable data device 191 comprises a smart card portion is preferred, however, because of the ability, with on-board microprocessor circuitry, to imbue the smart card with intelligence, thereby facilitating security and processing features. An alternative data storage and retrieval unit used instead of the smart card portion on the multi-functional portable data device preferably has built-in intelligence in the form of programmable microprocessor circuitry or the equivalent, to carry out the security and other processing features described herein.

In certain embodiments, when the multi-functional portable data device 191 includes credit card functionality and is used in regions where governmental regulations disallow the use of a credit card to put credit on a gaming machine, the credit card functionality of the multi-functional portable data device 191 is only used for the purpose of adding to or subtracting from the e-purse (and correspondingly debiting or crediting a financial institution account), but is not used for directly placing credit on a gaming machine itself.

In certain embodiments, when the multi-functional portable data device 191 includes debit card functionality, the multi-functional portable data device 191 may be so configured that it is unable to access a financial institution account for the purpose of directly transferring a cash amount to the electronic gaming machine, in order to avoid an undesirable level of interaction between the financial institution and the gaming system. In other embodiments, however, such interaction may be permissible.

In some embodiments, when governmental regulations so permit, the financial institution account information can be stored within the smart card IC chip 192 (or 392) of the multi-functional portable data device 191 (or 390), therefore obviating the need for a magnetic stripe 193. In such embodiments, the integrated data device reader 190 (or 301) need not have a magnetic stripe reading head or equivalent mechanism for reading static data from the multi-functional portable data device 191 (or 390).

In one aspect, a system is provided for conducting electronic monetary transfers to and from an electronic purse stored on a portable data device that includes a smart card portion comprising the electronic purse and a magnetic stripe portion. The system, in one embodiment, may comprise at least one electronic gaming machine adapted to receive the portable data device and communicate with the smart card portion thereof, the electronic gaming machine transferring money to and from the electronic purse of the smart card portion of the portable data device via electronic commands; and a data device reader adapted to receive the portable data device, the data device reader comprising a smart card interface for communicating with the smart card portion of the portable data device, a magnetic stripe reading head for reading the magnetic stripe portion of the portable data device, a communication link to a financial institution transaction processor, a communication link to a gaming establishment computer system, and a processor configured to performing a monetary transfer between a customer account managed by the financial institution transaction processor and the electronic purse of the portable data device. The electronic purse of the portable data device may store a credit amount allowing the portable data device to be utilized in the electronic gaming machine, and a portion of said credit amount may be automatically read out by the electronic gaming machine upon presentation of said portable data device to the electronic gaming machine.

In another aspect, an electronic gaming machine adapted to receive a portable data device such as heretofore described may comprise a data device reader, a gaming device processor, and a security module interposed between said data device reader and said gaming device processor, the security module comprising a data device reader interface for connection to the data device reader, a gaming device interface for connection to the gaming device processor, and a security module processor interposed between the data device reader interface and the gaming device interface, the security module processor configured to prevent communication between the data device reader and the gaming device processor unless the data device reader is first authenticated.

In a particular embodiment, a security module processor connected as described just above allows communications to pass through unimpeded between the data device reader and the gaming device processor after authentication of the data device reader. The security module processor may be configured to perform periodic authentication of the data device reader after the data device reader is first authenticated, and to prevent communication between the data device reader and the gaming device processor if the data device reader fails the periodic authentication.

Authentication in certain embodiments may occur as follows. The data device reader may first be authenticated when said security module processor generates a first random number, enciphers the first random number using a common key to generate a first enciphered random number, sends the first enciphered random number to the data device reader over the data device reader interface, receives a second enciphered random number from the data device reader over the data device reader interface, deciphers the second enciphered random number using the common key to generate a second random number, generates a session key from the first random number and the second random number, receives a third enciphered number from the data device reader over the data device reader interface, deciphers the third enciphered number using the session key to generate an authentication test value, and verifies that the authentication test value matches the second random number.

The electronic gaming machine may authenticate the portable data device prior to allowing monetary transfers with the electronic purse of the portable data device. In particular, the electronic gaming machine may authenticate the portable data device by carrying out an authentication process with the smart card portion of the portable data device, the authentication process being completed when a processor of said gaming machine generates a first random number, enciphers said first random number using a common key to generate a first enciphered random number, sends the first enciphered random number to the smart card portion of the portable data device over the smart card communication interface, receives a second enciphered random number from the smart card portion of the portable data device over the smart card communication interface, deciphers the second enciphered random number using the common key to generate a second random number, generates a session key from the first random number and the second random number, receives a third enciphered number from the smart card portion of the portable data device over the smart card communication interface, deciphers the third enciphered number using the session key to generate an authentication test value, and verifies that the authentication test value matches the second random number.

While preferred embodiments of the invention have been described herein, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed is:

1. A data device reader for reading portable data devices having a smart card portion and a readable static media portion, the smart card portion comprising an electronic purse, the data device reader comprising:

a smart card interface for communicating with the smart card portion of a portable data device;

a magnetic stripe reading head for reading the readable static media portion of the portable data device;

a processor configured to perform money transfers between an account indicated by the readable static media portion of the portable data device and the electronic purse of the portable data device;

a communication link to a financial institution computer system, said processor programmed to communicate with the financial institution computer system in order to conduct credit or debit transactions; and a communication link to a gaming establishment computer system having an account associated with the electronic purse of the portable data device.

2. The data device reader of claim 1, wherein the portable data device is generally flat and rectangular in shape, and wherein the data device reader further comprises a housing with a slot for receiving the portable data device.

3. The data device reader of claim 1, further comprising means for receiving user input specifying an amount of a money transfer to be conducted by said data device reader with respect to the portable data device.

4. The data device reader of claim 1, wherein said processor is programmed to communicate with both the financial institution computer system and the gaming establishment computer system during a single transaction in which a money transfer is performed between the account indicated by the readable static media portion of the portable data device and the electronic purse of the portable data device.

5. The data device reader of claim 4, wherein said processor is programmed to receive approval from both the financial institution computer system and the gaming establishment computer system before allowing a particular transaction to be completed.

6. An electronic device, comprising:
a data device reader adapted to receive portable data devices having a smart card portion and a readable static media portion, said smart card portion comprising an electronic purse;
a communication link to a financial institution transaction processor;
a processor configured to perform money transfers between a customer account managed by said financial institution transaction processor and the electronic purse of a portable data device presented to said data device reader;
a smart card interface for communicating with the smart card portion of the portable data device;
a magnetic stripe reading head for reading the readable static media portion of the portable data device; and
a communication link to a gaming establishment accounting system having an account associated with the electronic purse of the smart card portion of the portable data device.

7. The electronic device of claim 6, wherein said portable data device comprises a card, wherein said smart card portion of the portable data device comprises a smart card processor, wherein said electronic purse comprises a non-volatile memory accessible to said smart card processor, and wherein said readable static media portion comprises a magnetic stripe affixed to said card.

8. The electronic device of claim 7, wherein said portable data device is adapted to be received in electronic gaming machines, each of said electronic gaming machines comprising a smart card communication interface for communicating with the smart card portion of the portable data device and transferring monetary amounts between the electronic gaming machine and the electronic purse of the portable data device.

9. The electronic device of claim 8, wherein said portable data device is adapted to be received in banking card reading devices, each of said banking card reading devices comprising a magnetic stripe reading head for reading the readable static media portion of the portable data device.

10. The electronic device of claim 9, wherein said banking card reading devices perform a debit transaction with respect to a customer financial institution account upon reading and processing data in the readable static media portion of the portable data device.

11. The electronic device of claim 9, wherein said banking card reading devices perform a credit transaction with respect to a customer financial institution account upon reading and processing data in the readable static media portion of the portable data device.

12. The electronic device of claim 6, wherein said processor is configured to communicate with both the financial institution transaction processor and the gaming establishment accounting system during a single transaction in which a money transfer is performed between the customer account and the electronic purse of the smart card portion of the portable data device.

13. The electronic device of claim 12, wherein said processor is configured to receive approval from both the financial institution transaction processor and the gaming establishment accounting system before allowing a particular transaction to be completed.

14. A method, comprising the steps of:
receiving, in a data device reader, a portable data device having a smart card portion and a readable static media portion, said smart card portion comprising an electronic purse;
communicating between a smart card interface in the data device reader and the smart card portion of the portable data device;
reading the readable static media portion of the portable data device with a magnetic stripe reading head;
establishing a communication link from said data device reader to a financial institution computer system;
establishing a communication link from the data device reader to a gaming establishment accounting system having an account associated with the electronic purse of the smart card portion of the portable data device; and
performing a monetary transfer between a customer account managed by said financial institution computer system and the electronic purse of said portable data device.

15. The method of claim 14, wherein said portable data device comprises a card, wherein said smart card portion of the portable data device comprises a smart card processor, wherein said electronic purse comprises a non-volatile memory accessible to said smart card processor, and wherein said readable static media portion comprises a magnetic stripe affixed to said card.

16. The method of claim 15, wherein said portable data device is adapted to be received in electronic gaming machines, each of said electronic gaming machines comprising a smart card communication interface for communicating with the smart card portion of the portable data device and transferring monetary amounts between the electronic gaming machine and the electronic purse of the portable data device.

17. The method of claim 16, wherein said portable data device is adapted to be received in banking card reading devices, each of said banking card reading devices comprising a magnetic stripe reading head for reading the readable static media portion of the portable data device.

18. The method of claim 17, further comprising the steps of:
reading data from the readable static media portion of the portable data device; and performing a debit transaction at said banking card reading device with respect to a customer financial institution account identified by said data.

19. The method of claim 17, further comprising the steps of:

reading data from the readable static media portion of the portable data device; and performing a credit transaction at said banking card reading device with respect to a customer financial institution account identified by said data.

20. The method of claim 14, further comprising the step of receiving approval from both the financial institution computer system and the gaming establishment accounting system before allowing the monetary transfer to the electronic purse of said portable data device to be completed.

21. A system for conducting electronic monetary transfers to and from an electronic purse stored on a portable data device, said portable data device including a smart card portion comprising the electronic purse and a magnetic stripe portion, the system comprising:

at least one electronic gaming machine adapted to receive the portable data device and communicate with the smart card portion thereof, said electronic gaming machine transferring money to and from the electronic purse of the smart card portion of the portable data device via electronic commands; and a data device reader adapted to receive the portable data device, said data device reader comprising a smart card interface for communicating with the smart card portion of the portable data device;

a magnetic stripe reading head for reading the magnetic stripe portion of the portable data device;

a communication link to a financial institution transaction processor;

a communication link to a gaming establishment computer system having an account associated with the electronic purse; and a processor configured to performing a monetary transfer between a customer account managed by said financial institution transaction processor and the electronic purse of said portable data device.

22. The system of claim 21, wherein the electronic purse of the portable data device stores a credit amount allowing the portable data device to be utilized in the electronic gaming machine.

23. The system of claim 22, wherein a portion of said credit amount is automatically read out by the electronic gaming machine upon presentation of said portable data device to the electronic gaming machine.

24. The system of claim 21, wherein said electronic gaming machine comprises a data device reader, a gaming device processor, and a security module interposed between said data device reader and said gaming device processor, said security module comprising:

a data device reader interface for connection to said data device reader;

a gaming device interface for connection to said gaming device processor; and a security module processor interposed between said data device reader interface and said gaming device interface, said security module processor configured to prevent communication between said data device reader and said gaming device processor unless said data device reader is first authenticated.

25. The system of claim 24, wherein said security module processor allows communications to pass through unimpeded between said data device reader and said gaming device processor after authentication of said data device reader.

26. The system of claim 24, wherein said security module processor is configured to perform periodic authentication of said data device reader after said data device reader is first authenticated, and to prevent communication between said data device reader and said gaming device processor if said data device reader fails said periodic authentication.

27. The system of claim 24, wherein said data device reader is first authenticated when said security module processor generates a first random number, enciphers said first random number using a common key to generate a first enciphered random number, sends said first enciphered random number to said data device reader over said data device reader interface, receives a second enciphered random number from said data device reader over said data device reader interface, deciphers said second enciphered random number using said common key to generate a second random number, generates a session key from said first random number and said second random number, receives a third enciphered number from said data device reader over said data device reader interface, deciphers said third enciphered number using said session key to generate an authentication test value, and verifies that said authentication test value matches said second random number.

28. The system of claim 23, wherein said electronic gaming machine authenticates the portable data device prior to allowing monetary transfers with the electronic purse of the portable data device.

29. The system of 28, wherein said electronic gaming machine authenticates the portable data device by carrying out an authentication process with the smart card portion of the portable data device, said electronic gaming machine comprising a smart card communication interface, said authentication process being completed when a processor of said gaming machine generates a first random number, enciphers said first random number using a common key to generate a first enciphered random number, sends said first enciphered random number to said smart card portion of the portable data device over said smart card communication interface, receives a second enciphered random number from said smart card portion of the portable data device over said smart card communication interface, deciphers said second enciphered random number using said common key to generate a second random number, generates a session key from said first random number and said second random number, receives a third enciphered number from said smart card portion of the portable data device over said smart card communication interface, deciphers said third enciphered number using said session key to generate an authentication test value, and verifies that said authentication test value matches said second random number.

30. The system of claim 21, wherein said data device reader is configured to communicate with both the financial institution transaction processor and the gaming establishment computer system during a single transaction in which a money transfer is performed between the customer account and the electronic purse of said portable data device.

31. The system of claim 30, wherein said data device reader is configured to receive approval from both the financial institution transaction processor and the gaming establishment computer system before allowing a particular transaction to be completed.

32. Apparatus for conducting electronic monetary transfers to and from an electronic purse stored on a portable data device, said portable data device including a smart card portion comprising the electronic purse and a magnetic stripe portion, the apparatus comprising:

a smart card interface for communicating with the smart card portion of the portable data device;

a magnetic stripe reading head for reading the magnetic stripe portion of the portable data device;

a processor configured to perform monetary transactions in two different domains, a first domain associated with the smart card portion of the portable data device, and a second domain associated with the magnetic stripe portion of the portable data device;

a communication link to a financial institution transaction processor associated with the second domain; and a communication link to a gaming establishment accounting system associated with the first domain.

33. The apparatus of claim 32, wherein at least one electronic gaming machine is adapted to receive the portable data device and communicate with the smart card portion thereof, said electronic gaming machine transferring money to and from the electronic purse of the smart card portion of the portable data device via electronic commands.

34. The apparatus of claim 32, wherein said processor is configured to communicate with both the financial institution transaction processor and the gaming establishment accounting system during a single transaction in which an electronic money transfer is performed between a customer account associated with the second domain and the electronic purse of said portable data device.

35. The apparatus of claim 34, wherein said processor is configured to receive approval from both the financial institution transaction processor and the gaming establishment accounting system before allowing a particular transaction to be completed.

* * * * *